United States Patent
Kang et al.

(10) Patent No.: US 11,775,288 B2
(45) Date of Patent: *Oct. 3, 2023

(54) METHOD AND APPARATUS FOR GENERATING DIFFERENCE BETWEEN OLD AND NEW VERSIONS OF DATA FOR UPDATING SOFTWARE

(71) Applicant: LUNA Co.,Ltd., Daegu (KR)

(72) Inventors: Dong Soo Kang, Daegu (KR); Dong Hwan Lee, Daegu (KR); Tae Ho Lee, Daegu (KR); Seung Wook Baek, Daegu (KR)

(73) Assignee: KONAMOBILITY COMPANY LIMITED

( * ) Notice: Subject to any disclaimer, the term of this patent is extended or adjusted under 35 U.S.C. 154(b) by 0 days.

This patent is subject to a terminal disclaimer.

(21) Appl. No.: 17/051,433

(22) PCT Filed: Mar. 13, 2020

(86) PCT No.: PCT/KR2020/003493
§ 371 (c)(1),
(2) Date: Oct. 28, 2020

(87) PCT Pub. No.: WO2021/040166
PCT Pub. Date: Mar. 4, 2021

(65) Prior Publication Data
US 2021/0373882 A1   Dec. 2, 2021

(30) Foreign Application Priority Data
Aug. 27, 2019   (KR) .................. 10-2019-0105324

(51) Int. Cl.
*G06F 9/44*   (2018.01)
*G06F 9/445*   (2018.01)
(Continued)

(52) U.S. Cl.
CPC . *G06F 8/71* (2013.01); *G06F 8/65* (2013.01)

(58) Field of Classification Search
CPC ... G06F 8/71; G06F 8/65; G06F 16/18; G06F 16/1873; G06F 16/10; G06F 16/1744;
(Continued)

(56) References Cited

U.S. PATENT DOCUMENTS 5,832,520 A * 11/1998 Miller ..................... G06F 8/658
6,526,574 B1 * 2/2003 Jones ........................ G06F 8/60
717/168

(Continued)

FOREIGN PATENT DOCUMENTS

JP   2012190075 A   10/2012
KR   100390867 B1   7/2003
(Continued)

OTHER PUBLICATIONS

International Search Report for PCT/KR2020/003493 dated Jun. 26, 2020.
Written Opinion for PCT/KR2020/003493 dated Jun. 26, 2020.

*Primary Examiner* — Lewis A Bullock, Jr.
*Assistant Examiner* — Mohammad H Kabir
(74) *Attorney, Agent, or Firm* — Renaissance IP Law Group LLP (57) ABSTRACT

The present invention relates to a method and apparatus for generating difference between old and new versions of data (software data) for updating software, and in more detail, when updating software programs and their related data in client devices like autonomous vehicles and smartphones, an update management server generates the difference by comparing old and new versions of the software data, and provides the generated difference to client devices, thereby provided is a method and apparatus for making software update simple and fast.

6 Claims, 4 Drawing Sheets

(51) Int. Cl.
*H04W 8/22* (2009.01)
*G06F 8/71* (2018.01)
*G06F 8/65* (2018.01)

(58) Field of Classification Search
CPC ......... G06F 2212/401; H04N 1/32347; H03M 7/30; G10H 2250/635; G10L 19/00
See application file for complete search history.

(56) References Cited

U.S. PATENT DOCUMENTS

| | | | | |
|---|---|---|---|---|
| 8,498,965 | B1* | 7/2013 | Ren | G06F 8/658 707/625 |
| 8,862,555 | B1* | 10/2014 | Xu | G06F 16/1756 707/687 |
| 2003/0028867 | A1* | 2/2003 | Kryloff | G06F 8/658 717/171 |
| 2003/0182414 | A1* | 9/2003 | O'Neill | G06F 9/3004 709/223 |
| 2004/0098361 | A1* | 5/2004 | Peng | G06F 8/658 |
| 2005/0132179 | A1* | 6/2005 | Glaum | G06F 8/658 713/1 |
| 2006/0039618 | A1* | 2/2006 | Ogle | G06F 8/658 382/236 |
| 2007/0049263 | A1* | 3/2007 | Rajaram | H04W 8/245 455/418 |
| 2007/0245336 | A1* | 10/2007 | Lee | G06F 8/658 717/168 |
| 2011/0173604 | A1* | 7/2011 | Nakamura | G06F 8/63 717/173 |
| 2015/0277897 | A1* | 10/2015 | Deng | H04W 8/245 717/169 |

FOREIGN PATENT DOCUMENTS

| | | |
|---|---|---|
| KR | 20040022020 A | 3/2004 |
| KR | 100632904 B1 | 10/2006 |
| KR | 20150005164 A | 1/2015 |
| KR | 101541112 B1 | 7/2015 |
| KR | 20150089591 A | 8/2015 |
| KR | 101822485 B1 | 1/2018 |

\* cited by examiner

METHOD AND APPARATUS FOR GENERATING DIFFERENCE BETWEEN OLD AND NEW VERSIONS OF DATA FOR UPDATING SOFTWARE

TECHNICAL FIELD

The present disclosure relates to a method and apparatus for generating difference between old and new versions of data (software data) for updating software, and in more detail, when updating software programs and their related data in client devices like autonomous vehicles and smartphones, an update management server generates the difference by comparing old and new versions of the software data, and provides the generated difference to client devices, thereby provided is a method and apparatus for making software update simple and fast.

BACKGROUND ART

IT (Information Technology) industry is a kind of industry using information technology that focuses on an indirect value creation encompassing tangible and intangible technologies required for informational means such as a computer, a software, an Internet, multimedia, management innovation, and administrative reform, and so on.

The IT industry handles those including business data, voice conversations, photos, videos, multimedia, as well as media that have not yet appeared. In addition, the IT industry includes all forms of technologies required to develop, store and exchange information.

This kind of IT industry continues to lead the automotive industry, which is a traditional manufacturing industry that focuses on creating direct tangible values. Moreover, autonomous vehicles that drive autonomously while being aware of their own locations and surrounding circumstances have been recently developed, and their interests are growing.

In particular, in case of autonomous vehicles, in order to be aware of their own locations and surrounding circumstances, it is very important to have a hardware device for processing a large amount of data and a continuous software management capability. In other words, continuous updates for corresponding software are essential for continually fixing bugs and defects in hardware devices and responding quickly to ever changing laws and regulations.

On the other hand, as functions of wireless communication terminals such as smartphones become complicated, the software to be loaded on the terminals also have many kinds of bugs, but a user increasingly demands for adding functions. Accordingly, there is a need to perform software patching and function updating of a wireless communication terminal.

However, in case of the conventional autonomous vehicle as described above, it is necessary to visit a service center or a dealer shop in order to perform software update, and thus there are problems related to inefficiently spending time and expense.

In addition, in case of performing software patch or functional update of a wireless communication terminal, the wireless communication terminal conventionally downloads software through a network and performs software update. However, because of large amount of data, it takes a lot of time to download the data, the download caused to generate a large amount of traffic, and the costs for using data are increased. Moreover, while performing software download, other tasks cannot be performed, thus there is a problem in that it is impossible to efficiently use radio resources.

Therefore, the present invention, presents an update management server that generates a difference between the old and new data by comparing old and new versions of data for updating software, provides the generated difference to a client device like an autonomous vehicle or a smart phone, and performs the update of the software data including programs, kernels, and filesystems. Accordingly, it is possible to reduce processing time and cost by large amounts of data transmission, increase user convenience, and improve system stability.

Hereinafter, prior arts existing in the technical field of the present invention are to be briefly described as follows, and then the technical features of the present invention to be differentiated from the prior arts are described.

Korean Patent Registration No. 0632904 (2006.10.16.) provides a method and system for generating a compact difference result between an old program and a new program, Each program includes a reference entry that contains a reference to another entry in the program. Since this method generates a difference result according to the search result of the entry, the difference result could not be produced in a batch and thus there is a problem in that it takes a lot of processing time.

On the other hand, the present invention divides and processes old and new versions of software data into partitions and blocks, the sizes of the blocks are determined in advance, then the difference is generated, and thus the processing speed is fast. In addition, since the difference is generated only for the parts where old and new versions of software data are changed in blocks, there is an advantage of reducing the size of the differential data (i.e., difference). That is, since a predetermined length of data streams for a specific block in all the old and new versions of software data are compared, when the data related to a specific function block comprised in the specific block are only changed, the difference information and data are generated in view that the only data of the corresponding specific function block are changed. Since the only difference information is generated and no difference data is generated in the unchanged parts, the processing speed is fast and the size of the difference data is reduced.

In addition, Korean Patent Registration No. 1541112 (2015.07.31.) also relates to an FOTA (Firmware Over The Air) system and its execution method. Wherein the system comprises a communication unit for performing data communication with a FOTA server and receiving a download file, a download unit for controlling receiving of the download file through the communication unit, a socket layer for configuring a function library for network connection and data IO (Input Output) with the FOTA server, a control unit for comparing the download file of the download unit with the currently installed file, extracting a difference file, generating and installing an update file, and a memory unit for storing the update file.

However, this prior art is configured to upgrade a new firmware file, in which the new firmware is generated by extracting an added part through comparing the firmware downloaded from the FOTA terminal with the previous firmware. Contrarily, the present invention compares all data streams of a predetermined length for a specific block in old and new versions of software data, so that processing speed is fast and the size of difference data is reduced. Therefore, it is obvious that there exists difference in technical configurations (feature) by comparing the present invention and the prior art.

In addition, Korean Patent Publication No. 2004-0022020 (2004.03.11.) relates to a remote firmware upgrade method and its display device. Wherein after a network is connected, a server receives firmware provided according to display state and stores the firmware to a first storage area. A process tests the stored firmware and determines whether to upgrade the firmware according to the testing result. On the time of determining whether performing an upgrade, the existing firmware is updated by storing the stored firmware in the first storage area to a second storage area.

However, the prior art is configured to automatically perform firmware update through Internet and to prevent malfunctions that may occur during the upgrade by determining whether installing the firmware or not through a test after downloading the firmware. According to the present invention, when the update management server generates a difference through a comparison between old and new versions of software data, the data stream of a predetermined length for a block is compared for old and new versions of software data, thereby processing speed is fast, and the size of the difference data is reduced. The prior inventions fail to describe or suggest such technical features of the present invention.

DISCLOSURE

Technical Problem

The present invention is created to resolve the above-mentioned problems. One objective of the present invention is to provide a method and apparatus for efficiently updating software data including programs, kernels, and filesystems into client devices like autonomous vehicles or smart phones.

Another objective of the present invention is to provide a method and apparatus for comparing between old and new versions of software data so as to generate a difference for differential parts (for modification, insertion, deletion, etc.) between them, and then updating the software data simply and quickly on the client device based on the generated difference.

Another objective of the present invention is to provide a method and apparatus for increasing user convenience and system stability, and reducing the processing time and cost occurrence due to a large amount of data transmission, through the software data update of the client devices by using the difference between old and new versions of software data.

Technical Solution

A method for generating a difference between old and new versions of data for updating software in a difference generation device in accordance with one embodiment of the present invention, comprising: parsing old and new versions of a software data, and extracting information for partitions and blocks of old and new versions of the software data in the difference generation device; identifying number of the partitions and sizes of the blocks from the extracted information in the difference generation device; and generating the difference between old and new versions of the software data for the blocks comprised in each of the identified partitions, based on the number of the identified partitions and the sizes of the blocks in the difference generation device.

Wherein, Each of the partitions comprises at least one or more than one of blocks, and is distinguished according to a program, a kernel, or a filesystem; and each of the block is a data obtained by dividing all data of the corresponding partition by the sizes of the blocks in case of a program and a kernel, and each of the blocks is a data obtained by dividing each file data constituting the filesystem by the sizes of the blocks in case of the filesystem.

Wherein, generating the difference comprises: determining one of Equal, Insert, or Mod by comparing data streams for old and new versions of the software data in each of the blocks, and generating the difference by listing differential data streams comprising the determined one of Equal, Insert, and Mod.

Wherein, generating the difference comprising: generating a compressed data stream through compressing the listed differential data streams, wherein generating the compressed data stream is to generate the compressed data stream via reducing redundancy by listing the determined differential data streams in one-dimension, reducing redundancy by listing the determined differential data streams in two-dimension, or the combinations thereof, wherein the compression is lossless, and the compressed data stream comprises compression information comprising conditions for performing the compression.

The method for generating the difference further comprises: determining whether a size of available memory is enough in size to process the blocks of each of the partitions identified from the extracted information for the partitions and blocks; and reducing the size of blocks until the available memory can process the blocks of each of the partitions, if the size of available memory is not enough in size to process the blocks of each of the partitions, as a result of the determination.

The method for generating the difference further comprising: sorting entire old version of blocks by referring to the extracted information for the partitions and blocks; generating a first differential data stream between the sorted entire old version of blocks and first new version of a block; generating (n−1)th differential data stream between old version of blocks obtained by subtracting first new version of the block from the sorted entire old version of blocks and (n−1)th new version of a block; and generating (n)th differential data stream between old version of blocks obtained by subtracting first new version of the block to (n−1)th new version of the block from the sorted entire old version blocks and (n)th new version of a block; wherein generating each of the differential data streams is repeatedly performed until all blocks comprised in the corresponding each of partitions are processed.

Moreover, a device for generating a difference between old and new versions of data for updating software in accordance with another embodiment of the present invention, comprises: a parser configured to parse old and new versions of a software data, and extract information for partitions and blocks of old and new versions of the software data; an information identifier configured to identify number of the partitions and sizes of the blocks from the extracted information; and a difference generator configured to generate the difference between old and new versions of the software data for the blocks comprised in each of the identified partitions, based on the number of the identified partitions and the sizes of the blocks, Each of the partitions comprises at least one or more than one of blocks, and is distinguished according to a program, a kernel, or a filesystem; and each of the block is a data obtained by dividing all data of the corresponding partition by the sizes of the blocks in case of a program and a kernel, and each of the blocks is a data obtained by dividing each file data constituting the filesystem by the sizes of the blocks in case of the filesystem.

Wherein, the difference generator configured to determine one of Equal, Insert, or Mod by comparing data streams for old and new versions of the software data in each of the blocks, and generate the difference by listing differential data streams comprising the determined one of Equal, Insert, and Mod.

The device for generating the difference further comprises: a difference compressor configured to generate a compressed data stream via compressing the generated differential data streams, wherein a difference compressor further configured to generate the compressed data stream by reducing redundancy by listing the determined differential data streams in one-dimension, reducing redundancy by listing the determined differential data streams in two-dimension, or the combinations thereof, wherein the compression is lossless, and the compressed data stream comprises compression information comprising conditions for performing the compression.

Wherein, an information identifier configured to determine whether a size of available memory is enough in size to process the blocks of each of the partitions identified from the extracted information for the partitions and blocks; and reduce the size of blocks until the available memory can process the blocks of each of the partitions, if the size of available memory is not enough in size to process the blocks of each of the partitions, as a result of the determination.

Wherein the difference generator further configured to: sort entire old version of blocks by referring to the extracted information for the partitions and blocks; generate a first differential data stream between the sorted entire old version of blocks and first new version of a block; generate (n−1)th differential data stream between old version of blocks obtained by subtracting first new version of the block from the sorted entire old version of blocks and (n−1)th new version of a block; and generate (n)th differential data stream between old version of blocks obtained by subtracting first new version of the block to (n−1)th new version of the block from the sorted entire old version blocks and (n)th new version of a block; wherein each of the differential data streams is repeatedly generated until all blocks comprised in the corresponding each of partitions are processed.

Advantageous Effects

As described above, according to a method and apparatus for generating differential data (difference) between old and new versions of software data for updating software of the present invention, an update management server compares old and new versions of software data to generate the difference between those of old and new versions of software data, and the generated difference is provided to a client device like an autonomous vehicle or a smartphone to perform software data update simply and quickly. Therefore, it is not necessary to transmit entire new version of software data to the client device, thereby reducing update processing time and data transmission cost.

In particular, since the present invention compares a predetermined length of data streams for predetermined blocks in entire old and new versions of software data, when only specific function blocks included in any one of the blocks are changed, only difference information and data are generated for the changed corresponding function blocks. In addition, since the difference information is only generated and difference data is not generated for the unchanged part, the processing speed for generating the difference is fast, and the size of the difference data is reduced.

According to the present invention, it is effective for a user to increase temporal and economic efficiencies as well as convenience in use, because the user does not have to visit a service center or a designated place for updating software by himself.

In addition, according to the present invention, it is effective for one to improve the system stability of the client device, through enabling continuous software management to be performed via the update management server even on changing in laws or legal systems and on happening bugs and defects.

DETAILED DESCRIPTION

Hereinafter, a preferred embodiment of a method and apparatus for generating a difference between old and new versions of software data (data) for updating software of the present invention will be described in detail with reference to accompanying drawings. The same reference numerals presented in each drawing denote the same units. Also, structural or functional descriptions which are specific for the embodiments of the present invention are exemplified for the purpose of describing the embodiments according to the present invention, and unless being defined otherwise, all terms used herein including technical or scientific terms have the same meaning as those generally understood by those of ordinary skilled in the arts. Terms like those defined in a commonly used dictionary should be interpreted as having meanings consistent with those in the context of related technologies, and it is desirable not to be interpreted as ideal or excessively formal meanings unless explicitly defined herein.

Subjects to be updated by using differential data generated in the present invention are software data including a program, a kernel, and a file system. The software data is binary data in principle, but it is natural to support arbitrary data format including ASCII. That is, each of a program, a kernel, and a file system is preferably composed of binary data.

Meanwhile, in the present invention, it is possible to update each of files in each folder with binary data while maintaining the folder structure of a specific file system, and it is also possible to update the entire file system with binary data.

However, in the present invention, it is a principle to update binary data for individual files while maintaining the folder structure of a specific file system. In this case, differential data do not occur for unchanged file in new version of file system, and the differential data are generated only for changed file. Therefore, it is possible to reduce data generation cost, improve update speed of file system, and increase system stability related to the update.

On the other hand, when binary data is updated for specific entire file system, if there is information added to new version of file system, it is inefficient due that a differential data should be generated even for files that do not changed thereafter. Therefore, in this case, it is properly desirable to separately process the changed part and the unchanged part.

The program means an application program, a system program, and the like, and refers to determine the operation of the program, or to data recorded according to a certain format.

Kernel is the most important core of a computer operating system. The kernel includes an interrupt handler that processes all requests competitively requesting services of the kernel including terminated input/output operations, a scheduler to determine which programs share kernel processing time in what order, and a supervisor that actually gives to each of processes the right to use the computer at the end of schedule. The kernel has a memory manager that manages address space of operating system in memory or storage, and distributes them evenly among all peripherals and other users using services of the kernel.

The file system is preparing a set of rules for reading, writing, and finding data on a hard disk drive in advance in order to record data on a computer. The file system also means a system that provides names to computer files, logically indicates where to place the files for storage or retrieval, and so on. All operating systems such as DOS (Disk Operating System), Windows, OS/2, Macintosh, and Unix require a kind of file system. For example, FAT16, FAT32 and NTFS are for Windows operating system, and ext2, reiserFS and ext3 are for Linux operating system. The file system also saves files in a directory, provides a name to a newly generated file, sometimes limits the length of file names, indicates which characters can be used, and sometimes limits the length of extension in a file name. The file system also includes a format for setting a path to a file through directory structure. Sometimes the file system refers to a part of OS or additional programs that support to organize files systematically. NFS(Network File System) or AFS (Andrew File System) is representative in the file system.

Figure 1:
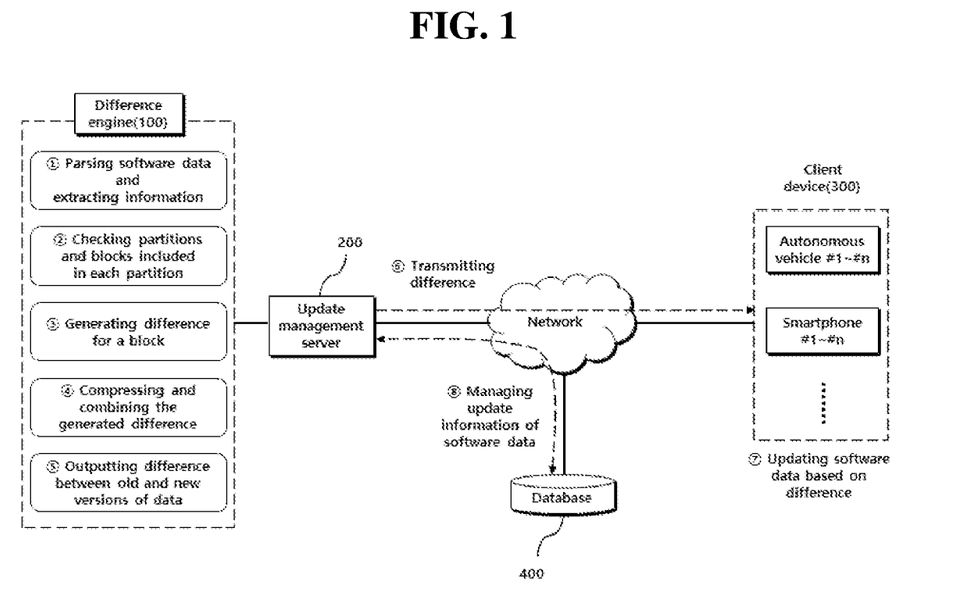
FIG. 1 is a drawing for explaining a configuration of a device generating the differential data between old and new versions of software data for updating software according to an embodiment of the present invention.

FIG. 1 is a drawing for explaining a configuration of a device for generating the differential data between old and new versions of software data for updating software according to an embodiment of the present invention.

As shown in FIG. 1, a device for generating the differential data in accordance with the present invention comprises a difference engine 100, an update management server 200, a client device 300, and a database 400.

The difference engine 100 is a device for generating the differential data between old and new versions of software data. When the software data (i.e., a program, a kernel, or a filesystem) is changed through operations such as modification, insertion, and deletion, only different parts (i.e., the parts in which modification, insertion, and deletion are made) are selected, instead of providing all the corresponding software data to the client device 300 to be updated. And then the selected different parts are sent to the client device 300 through the update management server 200, so that the client device 300 can simply and quickly perform software data updates.

That is, the difference engine 100 generates differential data for the only different parts, not for all new version of software data, and them provides the differential data to the client device 300. Accordingly, data generation cost is reduced, software data update rate is increased, and system stability related to software data update is improved.

For example, in case of an autonomous vehicle, the software has to be updated conventionally through a visit to a service center or a dealer shop. However, in accordance with the present invention, new version of software data can be automatically updated via various networks, thereby it is possible to obtain temporal and economical advantages.

In addition, even in case of a wireless communication terminal like a smartphone, since all new version of software data have been downloaded and updated traditionally, a lot of time and a large amount of traffic have been consumed. According to the present invention, only small capacity of differential information is downloaded and then the software data is updated, thereby reducing data usage cost and efficiently utilizing radio resources through quick update.

As described above, in order to efficiently update new version of software data to the client device 300 including an autonomous vehicle or a smartphone, the difference engine 100 parses software data information of the old and new versions of software data according to the request of the update management server 200. And the difference engine 100 extracts information on partitions (data) and blocks (data) of the software data (①).

For example, by parsing old and new versions of software data information managed by XML written by a developer, information on at least one or more partition including old version and new version of data (including number of partitions, position (start and end), name and type), a block size, and the like, and information on at least one or more block included in each partition, such as old version of a block, new version of a block, a block size, and the like are extracted.

Wherein the program data is divided into different partition according to a program, a kernel, or a file system, and the partition may comprise at least one or more blocks. The program data in a partition is also divided into different block, in which all the program data are divided by block size in case of a program (binary) and a kernel. In case of a filesystem, the block is derived by dividing each file data constituting the file system by corresponding block size.

In addition, the difference engine 100 identifies the number of partitions, block sizes, and the like from the extracted information on partitions and blocks (②).

The difference engine 100 also generates a differential data for a block included in each partition based on the identified number of partitions, block size, and the like (③). That is, by comparing old and new versions of software data included in the block for a predetermined length of data streams, one of Equal, Insert or Mod is determined and listed as differential data stream.

It is one of main features of the present invention that since predetermined length of data streams for a specific block in old and new versions of software data are entirely compared, for example, when only software data related to a specific function block included in the specific block is changed, only differential information and data are generated because the only software data for corresponding function block is changed, and only the differential information is generated and differential data is not generated for the unchanged parts. Therefore, the processing speed for generating differential data is very fast, and the size of differential data can be reduced.

The difference engine 100 also generates differential data for blocks included in each partition, compresses the generated differential data (④), and then performs a process of combining the compressed differential data for each block (⑤). Wherein, the compression of the differential data is to generate compressed data streams by compressing the differential data streams, and is a lossless compression, and comprises compression information related to conditions for performing the compression. Further, the compressed data stream is generated by reducing redundancy by aligning the differential data streams in one-dimension, reducing redundancy by aligning the differential data streams in two-dimension, or the combinations thereof.

The differential data is repeatedly generated until all blocks included in a corresponding partition are processed. After generating the differential data streams, compressing the generated differential data streams, and combining the compressed differential data streams for blocks of each partition are all finished, the generated differential data is output to the update management server 200.

Accordingly, the update management server 200 transmits the differential data between old and new versions of software data provided from the difference engine 100 to the client device 300 to be updated via various networks (⑥). And the client device 300 updates old version of software data to new version of software data, based on the differential data received from the update management server 200 (⑦).

Meanwhile, the difference engine 100 may be implemented as an independent device as shown in FIG. 1, and may be applied in communication with the update management server 200. In addition, the difference engine 100 may be integrated with and used in the update management server 200.

The update management server 200 is a computer operated by a business operator performing generation of new version of software data and update management used in the client device 300. When new version of software data is generated, the update management server 200 requests the difference engine 100 to generate differential data between old and new versions of software data.

When the differential data generated by comparing old and new versions of software data is input from the difference engine 100, the update management server 200 transmits the differential data generated by the difference engine 100 to corresponding client device 300 via network. And when the update completion information is received from the client device 300, the update management server 200 finishes the update of the software data.

The client device 300 is a software driven device such as a smartphone or an autonomous vehicle. The smartphone is a wireless communication terminal installed with various application programs. The autonomous vehicle is a device that grasps the surrounding situations and drives to the destination by itself by using a map, a satellite navigation system (using GPS), and various sensors. An update agent for updating software data is included therein the client device 300, or the update agent is independently installed in the client device 300.

That is, the client device 300 receives the differential data between old and new versions of the software data generated by the difference engine 100 from the update management server 200 via network, and updates old version of software data to new version of software data based on the differential data through the update agent. And when the update of software data is completed, the client device 300 generates update completion information, and transmits the generated update completion information to the update management server 200 via network.

The database 400 stores and manages various kinds of software used in the client device 300.

The database 400 stores and manages device types, software versions, update history, etc. for each client device 300, and also stores and manages the differential data between old and new versions of the software data generated by the difference engine 100.

Figure 2:
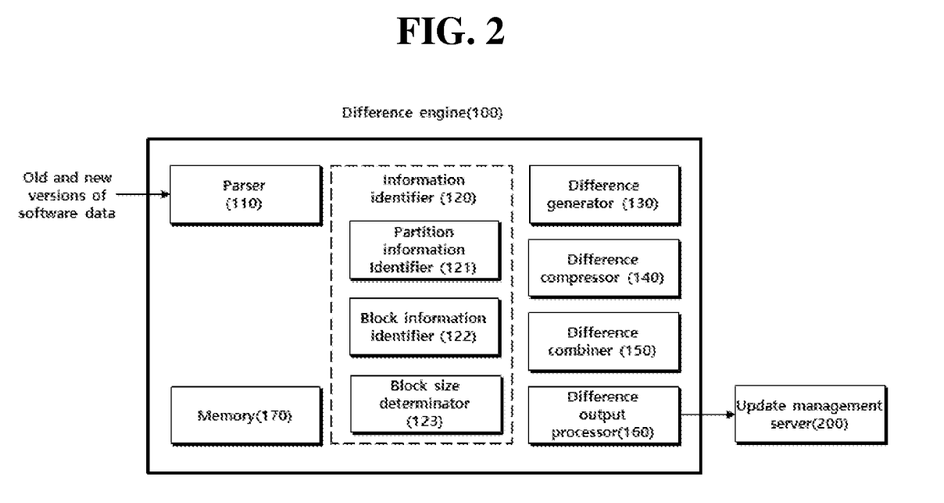
FIG. 2 is a drawing showing in more detail the configuration of the differential data generation engine according to an embodiment of the present invention.

FIG. 2 is a drawing shown in more detail the configuration of the difference engine according to an embodiment of the present invention.

As shown in FIG. 2, the difference engine 100 comprises a parser 110, an information identifier 120, a difference generator 130, a difference compressor 140, a difference combiner 150, and a difference output processor 160, a memory 170, and the like.

Although not shown in the drawing, the difference engine 100 may further comprise a power supply for supplying operating power to each component, an input processor for data input for each of functions, a main controller for overall control for each of components of the difference engine 100, and the like.

The parser 110 parses information of old and new versions of software data provided by the update management server 200, extracts information on partitions and blocks of the software data, and stores the extracted information on partitions and blocks of the software data in the memory 170. As is generally known, the parsing is that a series of character streams representing information of software data is translated into machine language to become a meaningful unit of information.

That is, the parser 110 extracts information on at least one or more partitions and blocks, through parsing old and new versions of software data managed with XML written by a developer. The information on at least one or more partitions comprises old and new versions of software data (including number of partitions, location, name, and type), a block size, and the like. The information on at least one or more blocks included in each of the partitions comprises old version of a block, new version of a block, block size, and the like.

The information identifier 120 comprises a partition information identifier 121, a block information identifier 122, and a block size determinator 123. The information identifier 120 checks the number of partitions, block size, and the like for old and new versions of software data from information on partitions and blocks of the software data parsed and extracted by the parser 110.

The partition information identifier 121 identifies old and new versions of software data including number of partitions, locations, names, and types, block sizes, and the like from information on a partition of the software data parsed and extracted by the parser 110, in order to generate differential data as many as the number of partitions in the difference generator 130.

The block information identifier 122 identifies an old version of a block, a new version of a block, block size, and the like from information on a block of software data parsed and extracted by the parser 110, in order to make the difference generator 130 generate a differential data based on blocks included in a corresponding partition.

The block size determinator 123 compares the block size with the available memory size and determines an optimal block size to be processed by the difference generator 130 based on the comparison result.

At this time, the block size determinator 123 determines whether the size of the available memory is enough in size to process a corresponding block of the partition identified by the partition information identifier 121, and as a result of the determination if the available memory size is not enough in size to process the block, the block size for each block of the partition identified by the partition information identifier 121 is reduced until the available memory size is enough in size to process the corresponding block of the partition, and then the optimal block size needed to be processed by the difference generator 130 is determined based on the reduced block size.

Hereinafter, the process of determining the optimal block size is described in more detail. The block size determinator 123 reduces the block size until the available memory size becomes sufficient size to process a corresponding block of the partition identified by the partition information identifier 121. And, if it is determined that the available memory size is sufficient to process the block of the partition identified by the partition information identifier 121, the block size determinator 123 determines whether the remaining size of the corresponding partition of new version of software data is larger than the block size. As a result of the determination, when the remaining size of new version of the software data is larger than the block size, the block size determinator 123 determines the block size as an optimal block size to be processed by the difference generator 130.

However, if the remaining size of new version of software data is smaller than or equal to the block size, the block size determinator 123 determines the remaining size of new version of the software data as an optimal block size to be processed by the difference generator 130. This is for processing when the remaining size of new version of software data becomes equal to or smaller than the block size (i.e., processing of the last block of the corresponding partition) in the process of repeatedly generating a differential data for each block of a specific partition.

The difference generator 130 generates a differential data for a block of a old and new versions of software data included in the partition based on data for each block included in each partition identified by the block information identifier 122. A detailed method of generating the differential data is described in more detail referring to FIG. 3 and FIG. 4.

The difference compressor 140 performs compression to reduce the size of differential data generated by the difference generator 130.

The compression of the differential data is to generate a compressed data stream by compressing aligned differential data streams. The compressed data stream is generated by aligning the differential data streams in one-dimension to reduce redundancy, by aligning the differential data streams in two-dimension to reduce redundancy, or by combinations thereof.

In addition, the compression is a lossless compression, and the compressed data stream comprises compression information including conditions for performing the compression.

On the other hand, it is noted that the compression of the differential data can be performed when the generation of the differential data for each partition is terminated or when the generation of the differential data for all partitions of new version of software data is finished.

The difference combiner 150 performs a function of combining the differential data streams compressed by the difference compressor 140 by a block or a partition.

The difference output processor 160 is configured to perform an interface function for inputting and outputting data to and from the update management server 200. The difference output processor 160 outputs the differential data combined by the difference combiner 150 by a block or a partition to the update management server 200.

The memory 170 stores various kinds of operational programs used in the difference engine 100.

In addition, the memory 170 also temporarily stores software data information parsed by the parser 110, partition information and block information identified by the information identifier 120, differential data generated by the difference generator 130, and the like.

Figure 3:
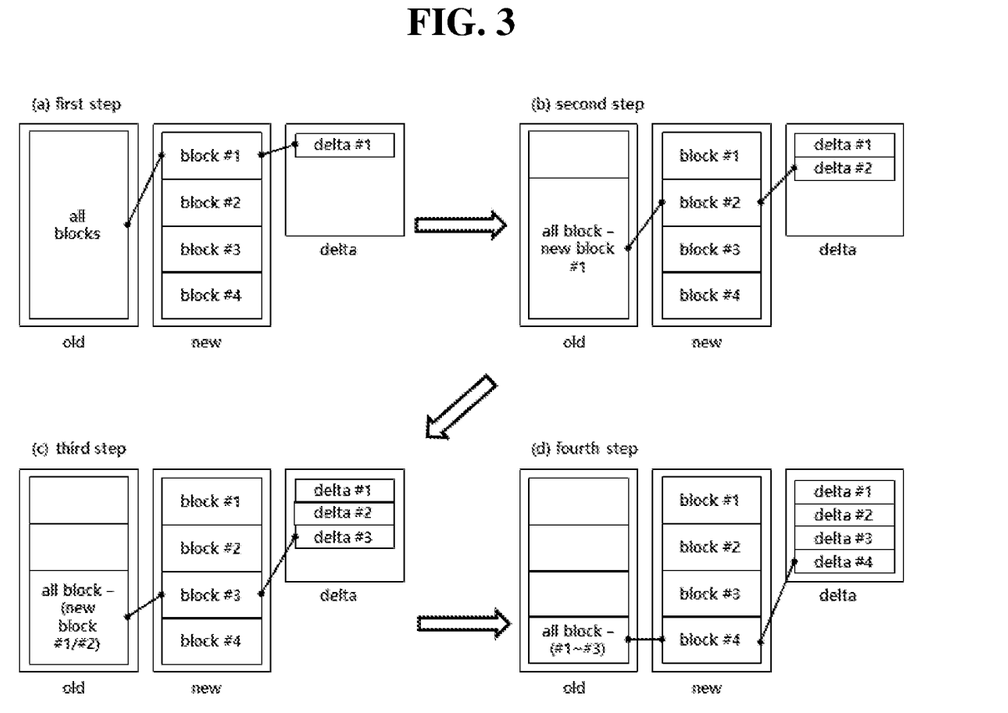
FIG. 3 is a drawing for explaining the concept of generating differential data between old and new versions of software data applied to the present invention.

FIG. 3 is a drawing for explaining the concept of generating differential data between old and new versions of software data applied to the present invention.

As shown in FIG. 3, the difference engine 100 generates a differential data between old and new versions of software data by comparing blocks constituting a partition of old version of software data and blocks constituting a partition of new version of software data. The case of existing four blocks in a specific partition for new version of software data is explained as an example hereinafter.

The difference engine 100 firstly sorts entire old version of blocks for a specific partition in order to perform convenience retrieval, and then generates a first differential data stream (delta #1) between the sorted entire old version of blocks and the first new version of block (block #1), which is shown in FIG. 3 (*a*) performing a first step. Wherein, the delta refers to a differential data stream listing one of Equal, Insert, or Mod, which is determined by comparing a predetermined length of data streams for old and new versions of software data included in each block.

The difference engine 100 also generates a second differential data stream (delta #2) between old version of a block (all blocks–new block #1) and a second new version of a block (block #2), wherein old version of a block is obtained by subtracting first new version of a block (block #1) from the sorted entire old version of blocks and a second new version of a block (block #2), as shown in FIG. 3 (*b*) performing a second step.

The difference engine 100 also generates a third differential data stream (delta #3) between old version of a block (all blocks–(new block #1+new block #2)) and third new version of a block (block #3), wherein old version of a block is obtained by subtracting first new version of a block (block #1) and second new version of a block (block #2) from the sorted entire old version of blocks, as shown in FIG. 3 (*c*) performing a third step.

The difference engine 100 also generates a fourth differential data stream (delta #4) between old version of a block and fourth new version of a block (block #4), wherein old version of a block is obtained by subtracting first new version of a block (block #1), second new version of a block (block #2), and third new version of a block (block #3) from the sorted entire old versions of blocks (all blocks–(new block #1+new block #2+new block #3)), as shown in FIG. 3 (*d*) performing a fourth step.

Figure 4:
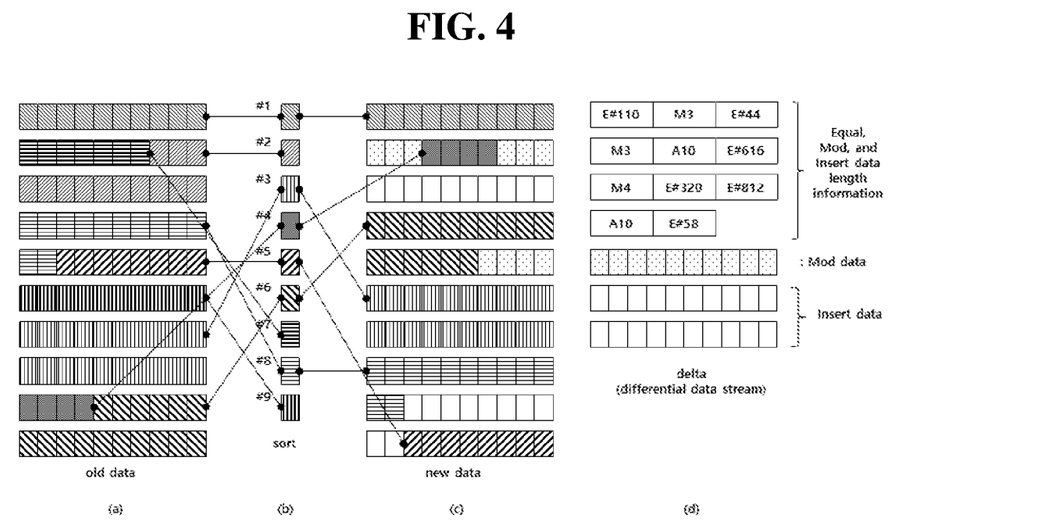
FIG. 4 is a drawing for explaining a method for generating differential data between old and new versions of software data applied to the present invention.

FIG. 4 is a drawing for explaining a method of generating differential data between old and new versions of software data applied to the present invention.

The difference engine 100 sorts block #1 to block #9, as shown in FIG. 4 (*b*), in order to conveniently search for blocks made up each partition of old version of software data shown in FIG. 4 (*a*). While the above-mentioned blocks as an example in the present invention are classified and sorted into nine types, the number of classified blocks may be reduced or increased according to the configuration of blocks.

Then, the difference engine 100 compares and searches the blocks (that is, new version of blocks) in a partition of new version of software data shown in FIG. 4 (*c*) with the sorted old version of blocks shown in FIG. 4 (*b*). As shown in FIG. 4 (*d*), the difference engine 100 creates a differential data stream (delta) based on the result of the comparison and search, wherein the differential data stream is created with Equal, Mod, and Insert, where if the data between old version of a block and new version of a block is the same, the differential data stream is described as Equal, if the data is partially corrected, the differential data stream is described as Mod, and if the data is newly added, the differential data stream is described as Insert.

The differential data stream shown in FIG. 4 (*d*) shows a length information for each block of new version of a block. The differential data stream is composed of data length information (that is, a differential data information) in which the data length is the length of the data stored into Equal, Mod, and Insert, and actual data (that is, an actual difference data) including modified data (MOD) data and inserted data (Insert).

Wherein, in case of the Equal, only data length information is included. In case of the Mod, data length information and actual data are included. In case of the Insert, data length information, actual data and position of next Equal are included. And in case of Insert, the difference engine 100 identifies through the delimiter (for example, set to 0xFEFF).

As shown in FIG. 4 (*d*), the data length information can be represented with E #110 (meaning that there are 10 data of block #1 which is the same data), M3 (meaning that three data are modified), E #44, M3, A10 (meaning that 10 data are newly inserted), E #616, M4, E #320, E #812, A10, E #58, and the like.

Hereinafter, an embodiment of a method for generating a differential data between old and new versions of software data for updating the software data according to the present invention configured as described above will be described in detail with reference to FIG. 5 and FIG. 6. Wherein each step according to the method of the present invention can be changed in order by environment or a person skilled in the art.

Figure 5:
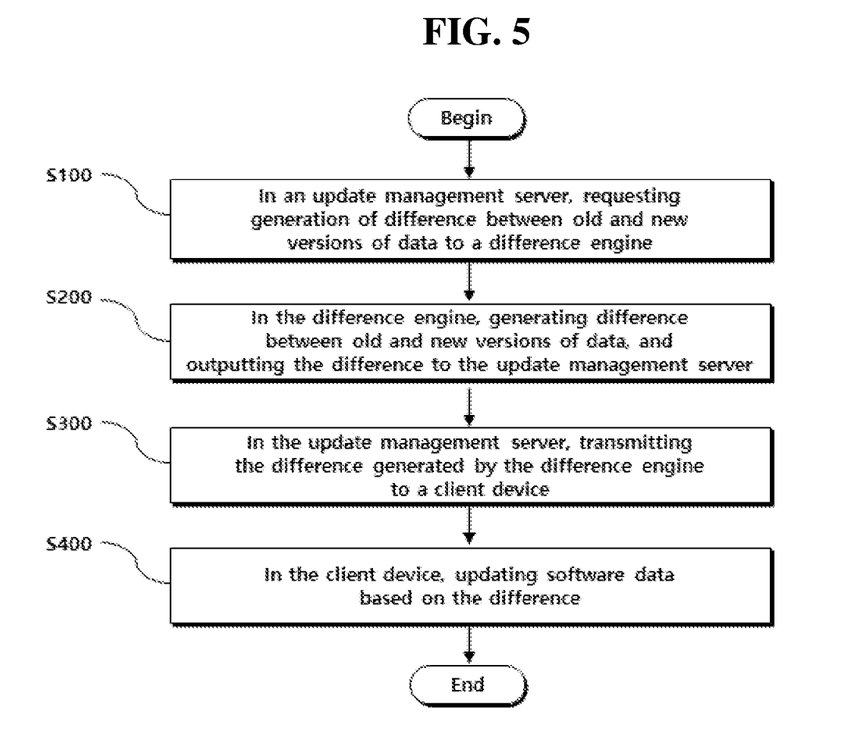
FIG. 5 is a flowchart illustrating in detail processes of updating software data according to an embodiment of the present invention.

FIG. 5 is a flowchart illustrating in detail a process of updating software data according to an embodiment of the present invention.

As shown in FIG. 5, when new version of software data is generated, the update management server 200 requests the difference engine 100 to generate a differential data between old and new versions of software data in order to update new version of software data to the client device 300 (S100).

Accordingly, the difference engine 100 generates a differential data between old and new versions of software data based on the request of the update management server 200, and provides the generated differential data to the update management server 200 (S200). A detailed description for generating differential data is described in detail in FIG. 6.

The update management server 200 receiving the differential data between the old and new versions of software data from the difference engine 100 through the step S200 transmits the differential data generated by the difference engine 100 to the client device 300 via network (S300).

The client device 300 also updates old version of software data to new version software data using an update agent based on the differential data received from the client device 300 (S400), and transmits update completion information to the update management server 200.

Then, the update management server 200 ends the software data update operation of the corresponding client device 300 according to the update completion information received from the client device 300.

Figure 6:
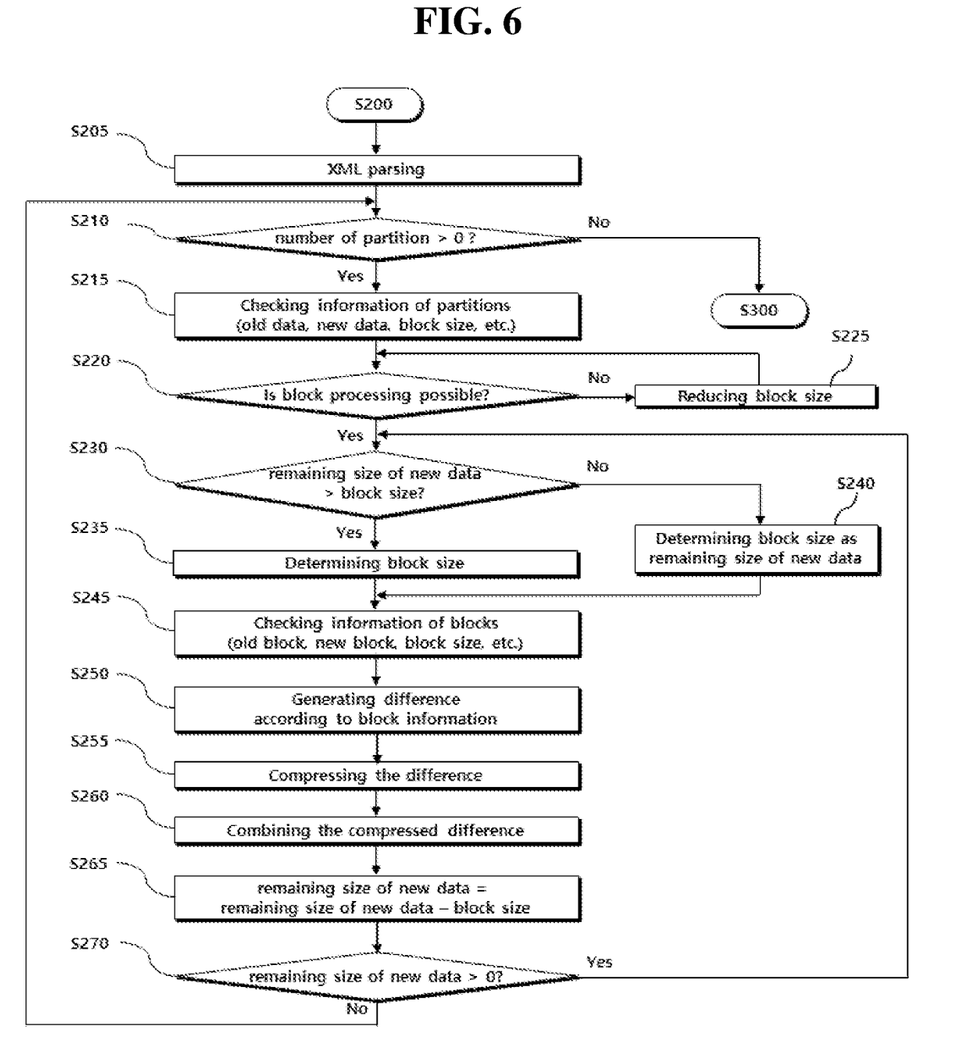
FIG. 6 is a flowchart illustrating in more detail operational processes of a method for generating differential data between old and new versions of software data for updating software according to an embodiment of the present invention.

FIG. 6 is a flowchart illustrating in more detail an operational process of a method for generating differential data between old and new versions of software data for software data update according to an embodiment of the present invention.

As shown in FIG. 6, the difference engine 100 parses information on partitions (data) and blocks (data) of old and new versions of software data according to the request of the update management server 200 (S205). That is, the difference engine 100 extracts information on at least one or more partitions for number of partitions, positions (start and end), old and new versions of software data of data including name and type, block size and the like; and the information on at least one or more blocks included in each partition, such as old version of a block, new version of a block, block size, and the like, by parsing old and new versions of software data information managed by XML written by a developer.

After performing XML parsing through S205, the difference engine 100 determines whether the number of partitions in a software data is 0 or more (S210). And if the number of partitions of the software data is more than zero (0) as the result of the determination, the difference engine 100 identifies old and new versions of software data including the location, name, and type, and the block size from the information on partitions of the software data parsed through S205 (S215).

After identifying information on a partition such as a block size through S215, the difference engine 100 performs comparing the identified block size with available memory size and determining the block size to be processed. That is, the determination of the block size is to determine an optimal block size required for generating differential data.

Hereinafter, determining the optimal block size required for generating a differential data is explained in more detail. The difference engine 100 determines whether available memory is enough in size to process a block in a partition identified in S215 (S220).

If the available memory is not enough in size to process a block in a partition as the result determined in S220, the difference engine 100 reduces the block size for each block of the partition identified in S215 until the block of the partition can be processed with the available memory (S225).

In addition, the difference engine 100 reduces the block size until the size of the available memory can process the block of the partition through S225, or as a result determined in S220, if the block of the partition can be processed with the available memory, it is determined whether the remaining size of new version of software data in the corresponding partition of new version of software data is greater than the block size (S230).

If the remaining size of new version of software data is larger than the block size as a result determined in S230, the difference engine 100 determines the block size as an optimal block size for generating a differential data (S235).

In addition, if the remaining size of new version of a data is less than or equal to the block size as a result of the determination in step S230, the difference engine 100 determines the remaining size of new version data as an optimal block size for difference generating (S240). That is, the step S240 is a step for processing the last part of the remaining size of new version of a data (the same as the block data or a smaller size than the block data) in the process of the difference generating for each block of a specific partition.

After determining the optimal block size for difference (i.e., differential data) generating through the steps S235 or S240, the difference engine 100 checks at least one or more block information including an old version block, a new version block, and a block size from information on a block of software data parsed in step S205 according to the determined block size (S245).

In addition, the difference engine 100 performs a step of generating a difference between old version data and new version data according to the block information checked in step S245 (S250).

In addition, step S250 for generating the difference is the same as described in FIG. 3. The difference engine 100 sorts entire old version of blocks checked from the parsed software data information. And the difference engine 100 generates first differential data stream between the sorted entire old version of a block and first new version of a block. And the difference engine 100 generates (n−1)th differential data stream between old version of a block obtained by subtracting first new version of a block from the sorted entire old version of blocks and (n−1)th new version of a block. And the difference engine 100 generates (n)th differential data stream between old version of a block obtained by subtracting first new version of a block to (n−1)th new version of a block from the sorted entire old version of a block and (n)th new version of a block. And the difference engine 100 repeats generation of the differential data stream until all blocks included in the corresponding partition are completely processed.

In addition, as described in FIG. 4, the difference consists of data length information indicating length information for each block of new version of a block, and actual data including partially modified data (Mod) and the newly added data (Insert). In the data length information, the same data between old version of a block and new version of a block is stored as Equal, and partially modified data is stored as Mod, and newly added data is classified as Insert, is classified and stored.

Now, after generating the difference through the step S250, the difference engine 100 compresses the generated difference (S255), combines the compressed difference (S260), and reduces the remaining size of new version of data by the block size (S265).

In addition, the difference engine 100 determines whether the remaining size of new version of data is greater than 0 (S270). And as a result of determination, if the remaining size of new version of data is greater than 0, the remaining size of new version of data of the corresponding partition of new version of software data is repeatedly performed after the step S230 to determine whether is greater than the block size.

If the remaining size of new version of data is equal to or less than 0 as a result of the determination in step S270, the difference engine 100 repeats after step S210 to determine whether the number of partitions is 0 or more.

On the other hand, if the number of partitions is 0 as a result of the determination in step S210 (i.e., when the difference generating is finished), the difference engine 100 transmits the difference which is generated, compressed, and combined through the steps from S250 to S260 to the update management server 200.

Accordingly, the update management server 200 transmits the difference (i.e. comparing data stream of a predetermined length for old and new versions of software data, and determining one of Equal, Insert, or Mod and listing them as a differential data stream) received from the difference engine 100 to the client device 300 to be updated so that software data update is performed.

As described above, the present invention has been described with reference to the embodiment shown in the drawings, but this is only exemplary, and those skilled in the art to which the art pertains will understand that it is possible to have various modifications and other equivalent embodiments. Therefore, the technical protection scope of the present invention should be determined by the following claims.

INDUSTRIAL APPLICABILITY

As described above, according to the present invention, an update management server compares between old and new versions of software data to generate a difference, and the generated difference is provided to a client device such as an autonomous vehicle or a smartphone to perform software data update simply and quickly. Therefore, it is not necessary to transmit entire new version of software data, thereby reducing the update processing time and the cost of data transmission. In particular, since the present invention compares all data streams of a predetermined length for a block with old and new versions of software data, when only a specific function block included in a block is changed, only the corresponding function block is changed, and the difference information and data are generated. In addition, since only the difference information is generated in the unchanged part and no difference data is generated, the processing speed of the difference generation is fast, and the size of the difference data is reduced.

In addition, the present invention can increase temporal and economic efficiencies and convenience because a user does not need to directly visit a service center or a designated place for updating software.

In addition, the present invention can improve the system stability of the client device by performing continuous software management on changes, bugs, and defects in laws or systems in the update management server.

The invention claimed is:

1. A method for generating a difference between old and new versions of data for updating software in a difference generation device, comprising:
parsing information from the old and new versions of software data, and extracting XML information regarding old and new versions of software data, wherein the XML information includes a partition information identifier that identifies information associated with partitions and a block information identifier that identifies information associated with blocks of the partitions of the old and new versions of the software data;
from the XML information, identifying a number of the partitions using the partition information identifier, and sizes of the blocks of the partitions, using the block information identifier;
comparing the sizes of the blocks in each of the partitions identified from the extracted XML information with a size of an available memory in the difference generation device;

determining an optimal block size of the blocks to be processed by the difference generation device based on a result of the comparing, wherein the determining an optimal block size is the size of the available memory if the available memory is enough to process a respective block of the partition identified by the partition information identifier, otherwise the block size is gradually reduced and compared to the available memory size until the available memory size is enough in size to process the respective block of the partition; and using the optimal block size, generating a difference between the old and new versions of the software data for the blocks comprised in each of the partitions, wherein the difference is performed for the identified number of the partitions associated with the partition information identifier and the determined sizes of the blocks associated with the block information identifier, wherein the generating of the difference comprises:
determining Equal, Insert, and Mod by comparing data for the old and new versions of the software data, and generating the difference by separately generating listed differential data streams, wherein each generated listed differential data stream corresponds to a determined one of Equal, Insert, or Mod, and wherein the Equal differential data stream contains the same data of the old and new versions of software data and block size information, the Insert differential data stream contains the inserted block size information and inserted data of the old and new versions of software data, and the Mod differential data stream contains modified block size information and the modified data of the old and new versions of software data.

2. The method for generating the difference of claim 1, wherein the generating of the difference comprises:
generating a compressed data stream through compressing the listed differential data streams,
wherein the generating of the compressed data stream comprises generating the compressed data stream by reducing redundancy by aligning the differential data streams in one-dimension, reducing redundancy by aligning the differential data streams in two-dimension, or a combination thereof, and
wherein the compressing is lossless, and the compressed data stream comprises compression information comprising conditions for performing the compression.

3. The method for generating the difference of claim 1, further comprising:
sorting the entire old version of the blocks by referring to the extracted information for the partitions and blocks;
generating a first differential data stream between the sorted entire old version of the blocks and a first new version of a block;
generating an (n−1)th differential data stream between the old version of the blocks obtained by subtracting the first new version of the block from the sorted entire old version of the blocks and the (n−1)th new version of the block; and
generating an (n)th differential data stream between the old version of blocks obtained by subtracting the first new version of the block to the (n−1)th new version of the block from the sorted entire old version of the blocks and an (n)th new version of the block,
wherein generating each of the differential data streams is repeatedly performed until all blocks comprised in each of the corresponding partitions are processed.

4. A device for generating a difference between old and new versions of data for updating software, comprising a difference engine having a parser, memory, a difference generator and a processor configured to:
parsing, by the parser, information from the old and new versions of software data, and extracting XML information regarding old and new versions of software data, wherein the XML information includes a partition information identifier that identifies information associated with partitions and a block information identifier that identifies information associated with blocks of the partitions of the old and new versions of the software data;
from the XML information, identifying a number of the partitions using the partition information identifier, and sizes of the blocks of the partitions, using the block information identifier;
comparing the sizes of the blocks in each of the partitions identified from the extracted XML information with a size of an available memory in the difference generation device;
determining an optimal block sizes of the blocks to be processed by the difference generation device based on a result of the comparing, wherein the determining an optimal block size is the size of the available memory if the available memory is enough to process a respective block of the partition identified by the partition information identifier, otherwise the block size is gradually reduced and compared to the available memory size until the available memory size is enough in size to process the respective block of the partition; and
using the optimal block size, generating a difference, by the difference generator, between the old and new versions of the software data for the blocks comprised in each of the partitions, wherein the difference is performed for the identified number of the partitions associated with the partition information identifier and the determined sizes of the blocks associated with the block information identifier,
wherein the generating of the difference comprises:
determining Equal, Insert, and Mod by comparing data for the old and new versions of the software data, and generating the difference by separately generating listed differential data streams, wherein each generated listed differential data stream corresponds to a determined one of Equal, Insert, or Mod, and wherein the Equal differential data stream contains the same data of the old and new versions of software data and block size information, the Insert differential data stream contains the inserted block size information and inserted data of the old and new versions of software data, and the Mod differential data stream contains modified block size information and the modified data of the old and new versions of software data.

5. The device for generating the difference of claim 4, wherein the difference engine is further configured to:
generate a compressed data stream via compressing the differential data streams,
wherein the difference engine is further configured to generate the compressed data stream by reducing redundancy by aligning the differential data streams in one-dimension, reducing redundancy by aligning the differential data streams in two-dimension, or a combination thereof, and wherein the compressing is lossless, and the compressed data stream comprises compression information comprising conditions for performing the compression.

6. The device for generating the difference of claim 4, wherein the difference engine is further configured to:
   sort the entire old version of the blocks by referring to the extracted information for the partitions and blocks;
   generate a first differential data stream between the sorted entire old version of the blocks and a first new version of a block;
   generate an (n−1)th differential data stream between the old version of the blocks obtained by subtracting the first new version of the block from the sorted entire old version of the blocks and the (n−1)th new version of a block; and
   generate an (n)th differential data stream between the old version of blocks obtained by subtracting the first new version of the block to the (n−1)th new version of the block from the sorted entire old version blocks and an (n)th new version of a block,
   wherein each of the differential data streams is repeatedly generated until all blocks comprised in each of the corresponding partitions are processed.

* * * * *